United States Patent [19]
Shirakawa

[11] Patent Number: 5,140,210
[45] Date of Patent: Aug. 18, 1992

[54] PERMANENT-MAGNET TYPE DYNAMOELECTRIC MACHINE ROTOR

[75] Inventor: Hiroyuki Shirakawa, Himeji, Japan

[73] Assignee: Mitsubishi Denki K.K., Tokyo, Japan

[21] Appl. No.: 659,451

[22] Filed: Feb. 20, 1991

Related U.S. Application Data

[63] Continuation of Ser. No. 375,801, Jul. 6, 1989, abandoned.

[30] Foreign Application Priority Data

Jul. 7, 1988 [JP] Japan .................. 63-169615

[51] Int. Cl.$^5$ ............ H02K 21/12; H02K 1/22; H02K 1/27; H02K 1/28
[52] U.S. Cl. ................... 310/156; 310/261; 310/262
[58] Field of Search ........... 310/46, 152, 156, 261, 310/262, 265, 271

[56] References Cited

U.S. PATENT DOCUMENTS

| | | | |
|---|---|---|---|
| 4,543,506 | 9/1985 | Kawada et al. | 310/261 |
| 4,591,749 | 5/1986 | Gauthier et al. | 310/156 |
| 4,639,627 | 1/1987 | Takekoshi et al. | 310/261 |
| 4,678,954 | 7/1987 | Takeda et al. | 310/261 |
| 4,697,114 | 9/1987 | Amemiya et al. | 310/156 |
| 4,742,259 | 5/1988 | Schaefer et al. | 310/156 |
| 4,855,630 | 8/1989 | Cole | 310/156 |

FOREIGN PATENT DOCUMENTS

| | | | |
|---|---|---|---|
| 0127863 | 10/1980 | Japan | 310/261 |
| 0019369 | 2/1981 | Japan | 310/152 |
| 0195461 | 11/1983 | Japan | 310/261 |
| 0121948 | 6/1985 | Japan | 310/261 |
| 0200753 | 10/1985 | Japan | 310/261 |
| 0199449 | 9/1986 | Japan | 310/261 |
| 63-38947 | 2/1988 | Japan | |

*Primary Examiner*—Steven L. Stephan
*Assistant Examiner*—C. LaBalle
*Attorney, Agent, or Firm*—Sughrue, Mion, Zinn, Macpeak & Seas

[57] ABSTRACT

A rotor for a permanent magnet-type dynamoelectric machine comprises a rotor shaft and a rotor magnet assembly including a plurality of permanent magnet segments each having a chamferred axially-extending outer side edges defining, together with the chamferred outer side edge of the adjacent magnet segment, a plurality of axial recesses when the magnet segments are mounted around the rotary shaft. The machine rotor further comprises a nonmagnetic support tube member for contacting and supporting the outer circumferential surface of each of the permanent magnet segments of the rotor magnet assembly, the support tube member having a plurality of inwardly extending projections for contacting and supporting the chamferred side surfaces of the magnet segments. The nonmagnetic support tube member may comprise a pair of metallic cup-shaped member having a substantially tubular members disposed around the rotor magnet assembly and a radially extending end plate member attached to the rotary shaft. Two cup-shaped members may be arranged in an opposing relationship so as to accommodate the rotor magnet assembly therein.

7 Claims, 2 Drawing Sheets

PERMANENT-MAGNET TYPE DYNAMOELECTRIC MACHINE ROTOR

This is a continuation of application Ser. No. 07/375,801 filed Jul. 6, 1989, now abandoned.

BACKGROUND OF THE INVENTION

This invention relates to a rotor for a permanent magnet-type dynamoelectric machine, and more particularly to a dynamoelectric machine rotor having a plurality of permanent magnet segments.

FIG. 1 illustrates, in a sectional side view, one example of a permanent magnet-type dynamoelectric machine 10 with the conventional rotor having a segmented rotor magnet assembly. The dynamoelectric machine 10 comprises a housing 11 and a stator 12 mounted to the housing 11 and including a stator core 13 and stator coils 14 wound around the core 13. The dynamoelectric machine 10 also comprises a rotor 15 rotatably supported within the housing 11 by a pair of bearings 16 and 17. The rotor 15 comprises a rotary shaft 18 rotatably supported by the bearings 16 and 17, a tubular cylindrical rotor core 19 press-fitted onto the shaft 18 and a rotor magnet assembly 20. The rotor magnet assembly 20 comprises a plurality of permanent magnet segments 21 attached to a circumferential surface 22 of the rotor core 19 to form a substantially tubular assembly as best seen in FIG. 2. In the illustrated example, the assembly 20 comprises four magnet segments 21 made of a ferrite magnetic material. As shown in FIG. 3, each magnet segment 21 has an inner cylindrical surface 23 extending along the outer circumference 22 of the rotor core 19, an outer cylindrical surface 24, two end surfaces 25, two side surfaces 26 extending axially in a plane containing the axis of the rotor 15, and two axially extending chamferred surfaces 27 at the outer axial side edges or corners of the magnet segment 21. The chamferred surfaces 27 of the magnet segments 21 are provided for reducing the cogging torque and the magnetic noise. The magnet segments 21 are attached to the outer surface 22 of the rotor core 19 by a suitable bonding agent 28. When associated, each of the chamferred axially-extending outer side edges 27 defines, together with the chamferred outer side edge 27 of the adjacent magnet segment 21, a plurality of axial recesses 29 of a V-shaped cross section.

The permanent magnet segments 21 of the rotor magnet assembly 20 of the conventional design are attached only by the bonding agent 28 applied between the inner cylindrical surface 23 of the segments 21 and the outer cylindrical surface 22 of the rotor core 19. Therefore, a massive centrifugal force is exerted on the segments 21, causing a tremendous amount of separating force to be applied to the bonding agent 28. Also, at the time of acceleration or deceleration during the period of starting or stopping, a massive shearing force applies to the bonding agent 28 between the magnet segments 21 and the outer cylindrical surface 22 of the rotor core 19.

Therefore, the dynamoelectric rotor assembly of this type utilizing magnet segments bonded to the rotor core is not suitable to be operated at a relatively high speed rotation or with a repeated stopping and starting operation. If the magnet segment or the fragment thereof is separated due to the centrifugal force during a high-speed rotation, the separated segment is very dangerous as it flies at a great speed. Also the magnet segment or the fragment which is separated from the assembly may be caught between the stator and the rotor, halting or damaging the dynamoelectric machine.

SUMMARY OF THE INVENTION

Accordingly, one object of the present invention is to provide a rotor for a permanent magnet-type dynamoelectric machine free from the above-discussed problems of the conventional permanent magnet-type dynamoelectric machine rotor.

Another object of the present invention is to provide a permanent magnet-type dynamoelectric machine rotor which can be operated at a relatively high speed rotation.

Another object of the present invention is to provide a permanent magnet-type dynamoelectric machine rotor which can be operated with a repeated stopping and starting operation.

A further object of the present invention is to provide a permanent magnet-type dynamoelectric machine rotor which is safe and reliable even during a high speed rotation.

Still another object of the present invention is to provide a permanent magnet-type dynamoelectric machine rotor in which no magnet segment or fragment separated from the assembly may be caught between the stator and the rotor, halting or damaging the dynamoelectric machine.

With the above objects in view, the rotor for a permanent magnet-type dynamoelectric machine comprises a rotor shaft and a rotor magnet assembly disposed around the rotary shaft for rotation therewith and including a plurality of permanent magnet segments each having a chamferred axially-extending outer side edges defining, together with the chamferred outer side edge of the adjacent magnet segment, a plurality of axial recesses when the magnet segments are mounted around the rotary shaft. The dynamoelectric machine rotor further comprises a nonmagnetic support tube member fitted over the rotor magnet assembly for contacting and supporting the outer circumferential surface of each of the permanent magnet segments of the rotor magnet assembly, the support tube member having a plurality of inwardly extending projections for contacting and supporting the chamferred side surfaces of the magnet segments.

The nonmagnetic support tube member may comprise a pair of metallic cup-shaped members having a substantially tubular member disposed around the stator magnet assembly and a radially extending end plate member attached to the rotary shaft. Two cup-shaped members may be arranged in an opposing relationship so as to accomodate the stator magnet assembly therein.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
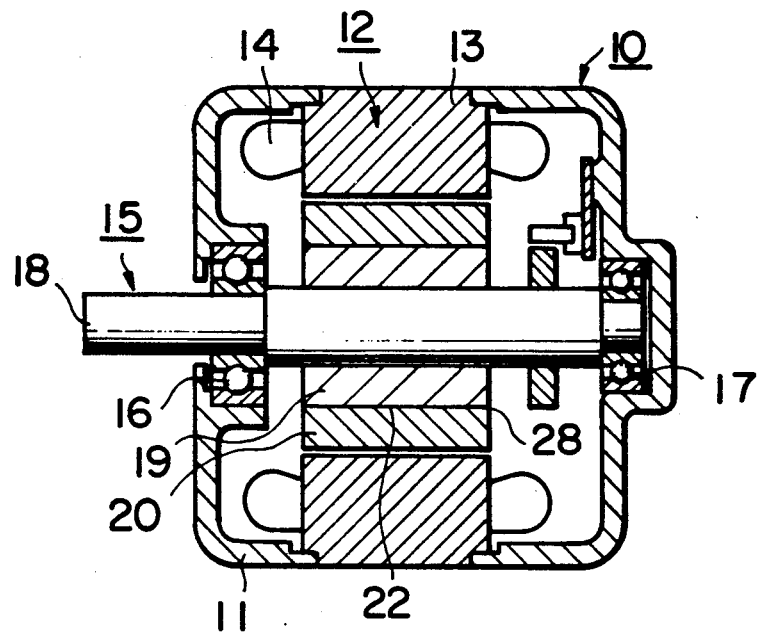
FIG. 1 is a sectional side view of a permanent magnet-type dynamoelectric machine in which a conventional permanent magnet rotor is incorporated.
Figure 4:
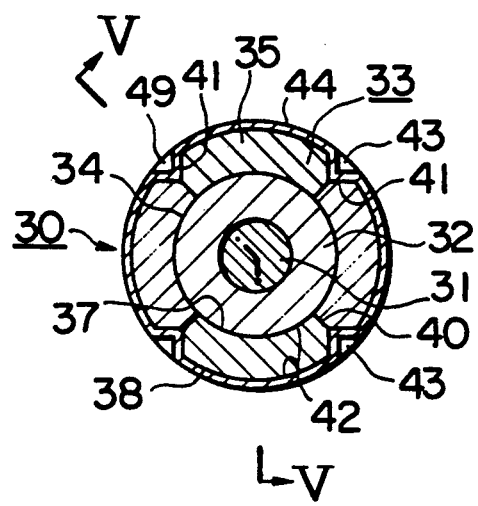
FIG. 4 is a cross-sectional front view of a dynamoelectric machine rotor of the present invention.
Figure 5:
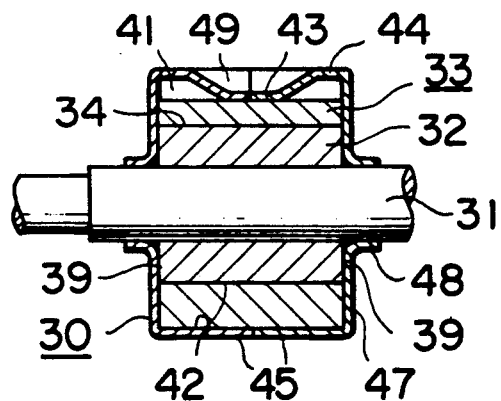
FIG. 5 is a sectional view of a dynamoelectric machine rotor taken along line V—V of FIG. 4.
Figure 6:
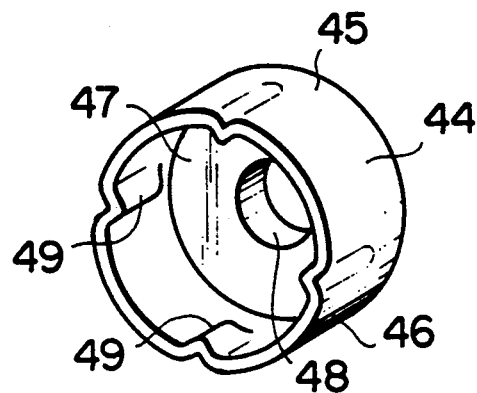
FIG. 6 is a perspective view showing a nonmagnetic support member used in the dynamoelectric machine shown in FIGS. 4 and 5.

FIGS. 4 to 6 illustrate one embodiment of a permanent magnet-type dynamoelectric machine rotor 30 of the present invention which may be used in place of the conventional rotor 15 of the dynamoelectric machine 10 described and shown in conjunction with FIG. 1.

Figure 2:
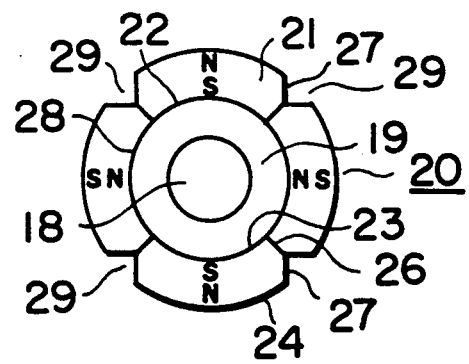
FIG. 2 is an end view of the rotor shown in FIG. 1 having a segmented rotor magnet.
Figure 3:
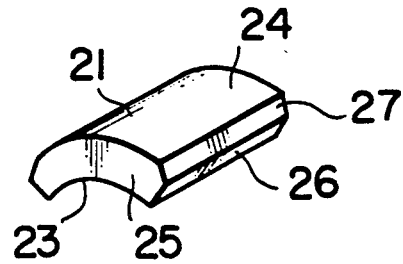
FIG. 3 is a perspective view of a permanent magnet segment shown in FIGS. 1 and 2.

The dynamoelectric machine rotor 30 of the present invention comprises a rotary shaft 31 which can be rotatably supported by the bearings 16 and 17 of the housing 11 of the dynamoelectric machine 10. A tubular cylindrical rotor core 32 is press-fit on the rotary shaft 31, and a rotor magnet assembly 33 is mounted on a cylindrical outer surface 34 of the rotor core 32. The rotor magnet assembly 33 comprises a plurality of permanent magnet segments 35 attached to the outer surface 34 of the rotor core 32 to form the substantially tubular assembly 33 as best seen in FIG. 4. In the illustrated embodiment, the rotor magnet assembly 33 comprises four magnet segments 35 made of a ferrite magnetic material. Similarly to the magnet segments 21 shown in FIGS. 2 and 3, each magnet segment 35 has an inner cylindrical surface 37 extending along the outer cylindrical surface 34 of the rotor core 32, an outer cylindrical surface 38, two end surfaces 39, two side surfaces 40 extending axially in a plane containing the axis of the rotor 30, and two axially extending chamferred surfaces 41 at the outer axial side edges or corners of the magnet segments 35. The chamferred surfaces 41 of the magnet segments 35 are provided for reducing the cogging torque and the magnetic noise. The magnet segments 35 are attached to the outer surface 34 of the rotor core 32 by a suitable bonding agent 42. When the magnet segment 35 are assembled and bonded around the rotor core 32, each of the chamferred axially-extending outer side edges 41 defines, together with the chamferred outer side edge 41 of the adjacent magnet segment 35, a plurality of axial recesses 43 of a substantially V-shaped cross section.

According to the present invention, the dynamoelectric machine rotor 30 comprises a nonmagnetic tubular support member 44 fitted over the rotor magnet assembly 33 for contacting and supporting the outer circumferential surface 38 of each of the permanent magnet segments 35 of the rotor magnet assembly 33. The nonmagnetic support member 44 may be formed by press-forming a thin metallic sheet of a nonmagnetic stainless steel or brass. The nonmagnetic support member 44 comprises a pair of metallic cup-shaped members 45 each having a substantially tubular member 46 disposed around the rotor magnet assembly 33 and a radially extending end plate member 47 attached by welding or caulking to the rotary shaft 31 through a substantially cylindrical sleeve portion 48 axially extending from the inner periphery of the central opening of the end plate member 47. Two cup-shaped members 45 are arranged in an opposing relationship with their open ends facing each other to define an annular space for accommodating the rotor magnet assembly 33 therein.

The cup-shaped member 45 is provides at the tubular member 46 with a plurality of inwardly projecting, press-formed projections 49 for contacting and supporting the chamferred side surfaces 41 of the magnet segments 33 assembled on the rotor core 32. In the illustrated embodiment, four projections 49 are provided because the number of the magnet segments and therefore the V-shaped recesses 43 defined by the chamberred surfaces 41 are four. The projections 49 axially extend from the open end of the cup-shaped member 45 and terminate before they reach the end plate member 47. Preferably, the axial length of the projections 49 may be selected to be from about ¼ to about ½ of the depth of the cup-shaped support member 44 for facilitating press-forming.

During assembly of the dynamoelectric machine rotor of the present invention, the rotor core 32 is press-fit on a predetermined position on the rotary shaft 31, and one of the cup-shaped members 45 is press-fit or welded to be secured at the mounting sleeve 48 on the rotary shaft 31 so that it contains a half of the rotor core 32 in the open end of the cup-shaped member 45. Then a layer of a bonding agent 42 is applied on the entire outer surface of the rotor core 32 as well as the entire inner surface of the cup-shaped member 45 secured on the rotary shaft 31. Then, four permanent magnet segments 33 are inserted one by one from the open end of the cup-shaped member 45 into the space defined between the cup-shaped member 45 and the rotor core 32. After four magnet segments 33 are mounted on the rotor core 32 and are partly supported by the cup-shaped member 45, the other cup-shaped member 45 with a bonding agent applied on the inner surface thereof is forcedly placed over the rotary shaft 31 from the opposite end of the shaft 31 until it abuts against the end face of the rotor core 32 and the magnet segments 33 as well as against the open end of the first cup-shaped member 45. Finally, the cylindrical sleeves 48 are secured to the rotary shaft 31 by welding or caulking, whereby two cup-shaped members 45 constitute the nonmagnetic support member 44 of the present invention.

During assembly, the axially extending projections 49 formed in the cup-shaped member 45 engage the chamferred surfaces 41 of the magnet segments 33 and serve as a guide for them while they are being inserted into the cup-shaped member 45. When the second cup-shaped member 45 is being fitted over the magnet segments 33, the V-shaped recesses 43 serve as guides for the cup-shaped member 45.

During the operation of the dynamoelectric motor, various circumferential mechanical forces acting on the respective magnet segments 33 can be supported by the nonmagnetic support member 44 which securely engages the magnet segments 33 and is firmly connected to the rotary shaft 31. A massive centrifugal force exerted on the segments 33, which otherwise causes a tremendous amount of separating force to be applied to the bonding agent 42 between the segments 43 and the rotor core 32, is supported at the cylindrical member 46 of the cup-shaped member 45. Also, massive circumferential forces applied to the magnet segments 33 at the time of acceleration or deceleration during starting or stopping are supported by the projections 49 which are in contact with the chamferred surfaces of the magnet segments 33. The end plate members of the cup-shaped member 45 serve to prevent axial movement of the magnet segments 33.

Therefore, the dynamoelectric rotor assembly of the present invention can be safely and reliably operated at a relatively high speed rotation or with a repeated stopping and starting operation without any fear that the magnet segment or the fragment thereof may be separated due to the centrifugal force during a high-speed rotation.

While the embodiment of the present invention as above described utilizes the bonding agent 42 applied on the inner surface of the cup-shaped member 45, this layer of the bonding agent between the magnet segments 33 and the support member 44 may be eliminated when the dynamoelectric machine is small in capacity. Also, the nonmagnetic support member 44 may be modified to cover only some portion of the outer cylindrical surface close to the axial ends of the magnet segments 33 and the central portion of the magnet segments 33 is left uncovered.

What is claimed is:

1. A rotor for a permanent magnet-type dynamoelectric machine having reduced cogging torque and magnetic noise, comprising:

a rotor shaft;

a rotor magnet assembly disposed around said rotary shaft for rotation therewith and having reduced cogging torque and magnetic noise, said rotor magnet assembly including a plurality of permanent magnet segments each having a plurality of chamferred axially-extending outer side edges, said magnet segments defining, together with one of said chamferred side edges of an adjacent magnet segment, a plurality of axial recesses when said magnetic segments are mounted around said rotary shaft; and nonmagnetic support tube means fitted over said rotor magnet assembly for contacting and supporting an outer circumferential surface of each of said permanent magnet segments of said rotor magnet assembly, said nonmagnetic support tube means having a plurality of inwardly extending projections for contacting and supporting said chamferred side edges of said magnet segments.

2. A rotor for a permanent-magnet type dynamoelectric machine as claimed in claim 1, wherein said nonmagnetic support tube means comprises a metallic cup-shaped member having a substantially tubular member disposed around the rotor magnet assembly and a radially extending end plate member attached to said rotary shaft.

3. A rotor for a permanent-magnet type dynamoelectric machine as claimed in claim 2, wherein said nonmagnetic support tube means further comprises another metallic cup-shaped member similar to the first cup-shaped member, said two cup-shaped members being arranged in an opposing relationship so as to accomodate said rotor magnet assembly therein.

4. A rotor for a permanent-magnet type dynamoelectric machine as claimed in claim 2, wherein said end plate of said metallic cup-shaped member further comprises a central opening for receiving therein said rotary shaft, and a mounting member axially extending from said end plate member along said rotary shaft.

5. A rotor for a permanent-magnet type dynamoelectric machine as claimed in claim 2, further comprising a layer of bonding agent disposed between said nonmagnetic support tube means and said rotor magnet assembly.

6. A rotor for a permanent magnet-type dynamoelectric machine having reduced cogging torque and magnetic noise, comprising:

a rotor shaft;

a rotor magnet assembly disposed around said rotary shaft for rotation therewith and having reduced cogging torque and magnetic noise, said rotor magnet assembly including a plurality of permanent magnet segments each having a plurality of chamfered axially-extending outer side edges, said magnet segments defining, together with one of said chamfered side edges of an adjacent magnet segment, a plurality of axial recesses when said magnetic segments are mounted around said rotary shaft; and nonmagnetic support tube means comprising a metallic cup-shaped member having a substantially tubular member disposed around the rotor magnet assembly and a radially extending end plate member attached to the rotary shaft fitted over said rotor magnet assembly for contacting and supporting an outer circumferential surface of each of said permanent magnet segments of said rotor magnet assembly, said nonmagnetic support tube means having a plurality of inwardly extending projections for contacting and supporting said chamferred side edges of said magnet segments, wherein said inwardly extending projections are inwardly projecting ridges extending in the axial direction for a partial depth of said cup-shaped member.

7. A rotor for a permanent-magnet type dynamoelectric machine as claimed in claim 6, wherein said partial depth is in the range of ⅛ to ¼ of the depth of said cup-shaped member.

* * * * *